Patented Aug. 28, 1945

2,383,793

UNITED STATES PATENT OFFICE 2,383,793

METHODS FOR REACTING FURFURYL ALCOHOL AND ACID CONDENSATION PRODUCTS OF FURFURYL ALCOHOL WITH GLYOXAL AND POLYMERIZED GLYOXAL AND PRODUCTS PRODUCED THEREBY

Mortimer T. Harvey, South Orange, and Robert F. Durst, Orange, N. J., assignors to Harvel Research Corporation, a corporation of New Jersey No Drawing. Application July 24, 1943,
Serial No. 496,066

19 Claims. (Cl. 260—17.5)

This invention relates to novel products and to methods for preparing the same. In its more specific aspect the invention is directed to methods for producing novel organic condensation products and to the products themselves.

Prior to our invention, Mortimer T. Harvey provided methods for producing and made useful heat reactive resins of formaldehyde and furfuryl alcohol and fusible polymerized condensation reaction products of furfuryl alcohol. These heat reactive resins as well as the methods for producing them are disclosed in applications Serial No. 436,475 filed March 27, 1942, and 476,968 (now Patent No. 3,343,972, March 14, 1944) and 476,969 (now Patent No. 2,343,973, March 14, 1944) filed February 24, 1943.

In the course of our experimentations with furfuryl alcohol and polymerized condensation reaction products of furfuryl alcohol, we have discovered that novel resins may be produced by reacting the same with glyoxal. Among some of the advantages of reacting said products with glyoxal are (1) commercially practical yields of commercially useful resins may be obtained in a comparatively simple and efficient manner, and (2) when compared with formaldehyde (a) the speed of reaction is much greater because the operating refluxing temperature at atmospheric pressure is relatively high, (b) the use of glyoxal is less hazardous because its vapors are less obnoxious and less corrosive on the human skin, (c) its intermediate reaction products have a lower loss of volatiles when converted from a liquid fusible resin to a heat hardened resin, (d) the heat hardened resins are tougher.

Briefly this invention may be practiced by reacting furfuryl alcohol and the intermediate or fusible acid polymerized condensation products of furfuryl alcohol with glyoxal under acidic conditions. We prefer that said acidic conditions be such that no exothermic and turbulent reaction takes place without the application of external heat. The glyoxal may be used in a number of different forms and may be either the monomer or polymer or may be derived from a glyoxal yielding reaction. The monomer may be obtained as a vapor by heating polymerized glyoxal with phosphorous pentoxide, and has the formula OCH—CHO. The polymer may be obtained in aqueous solution or as a solid and has the generally accepted formula

(OHC—CHO)$x$

The furfuryl alcohol is obtainable on the market and the fusible polymerized acid condensation products may be prepared in the manner set forth in said patent application 476,969.

The fusible polymerized acid condensation products of furfuryl alcohol differ from the furfuryl alcohol itself in that they have a very low solubility in water characteristics when compared with furfuryl alcohol. In fact said fusible polymerized acid condensation products of furfuryl alcohol are almost completely insoluble in water, whereas furfuryl alcohol is readily soluble in water; the fusible polymerized acid condensation products of furfuryl alcohol are soluble only with difficulty in alcohol whereas furfuryl alcohol is readily soluble in alcohol; the fusible polymerized acid condensation products of furfuryl alcohol have a higher viscosity characteristic than does furfuryl alcohol; furfuryl alcohol is a colorless liquid having a specific gravity of 1.136 at 20° C. whereas the fusible polymerized acid condensation products of furfuryl alcohol vary in viscosity from a viscosity slightly greater than that of furfuryl alcohol to a viscosity wherein the product is a rubbery mass. The fusible polymerized acid condensation products of furfuryl alcohol have no definite boiling point whereas furfuryl alcohol boils at approximately 170° C.

The products of the examples A to G shown below in the method of making the fusible acid condensation-polymerization product of furfuryl alcohol contain some material which has a boiling point approximately the same as that of furfuryl alcohol but the percentage thereof varies from zero to not over about five per cent. The fusible acid condensation-polymerization product from furfuryl alcohol has a negligible fraction which will boil at 170° C. at atmospheric pressure and is soluble in water in contrast to furfuryl alcohol all of which boils at 170° C. As illustrative example, it has been found in the examples herein shown that less than five per cent of the resulting product in any one of the Examples A to G inclusive, fulfilled these stated conditions as to boiling point and solubility in water, that is, a boiling point of about 170° C. and complete solubility in water.

The following examples illustrate methods of obtaining the fusible acid condensation-polymerization products of furfuryl alcohol:

A. Five hundred grams of furfuryl alcohol and 25 grams of 80% lactic acid are heated together for one hour at approximately 95° C. to 110° C. Water is split off in this reaction and the product shows an increase of viscosity over the original furfuryl alcohol of 20% and it is insoluble in water, partially soluble in alcohol and completely soluble in acetone. The specific gravity of this reaction product is 1.150 at 25° C. Whereas the furfuryl alcohol has a boiling point below 170° C. at atmospheric pressure, a portion of the product of Example A completely neutralized, displayed no definite boiling point.

B. 1,000 grams of furfuryl alcohol and 50 grams of 80% lactic acid were refluxed together for one-half hour at approximately 95° C. to 110° C. and then dehydrated while refluxing. 70 cc. of water were removed within one hour. The specific gravity of the remaining product was 1.165 at 25° C. The viscosity at 25° C. was 50 centipoises. It was insoluble in water, completely soluble in acetone, only partially soluble in alcohol.

C. 1,000 grams of furfuryl alcohol, 50 grams of formic acid (90%) were refluxed for one and one-half hours at approximately 95° C. to 110° C. and dehydrated to 150° C. in the open at atmospheric pressure. The viscosity of the finished product was 570 centipoises at 25° C. It was soluble in acetone, dissolved partially in alcohol with a high concentration of resin; separates with a high percentage of alcohol and is practically insoluble in petroleum spirits, soluble in aromatic solvents and insoluble in water. The specific gravity was 1.200 at 25° C.

D. 100 pounds of furfuryl alcohol and 6 pounds of a 70% solution of hydroxy acetic acid, were boiled under a reflux condenser for two hours at approximately 105° C. The reaction product was partially dehydrated at atmospheric pressure and finally at reduced pressure until the temperature reached approximately 108° C. The mass was then cooled. The product was soluble in acetone, insoluble in water. It had a specific gravity of 1.23 at 25° C.

E. 100 parts by weight of furfuryl alcohol, 10 parts by weight of calcium chloride were brought to a point of ebullition under a reflux condenser at approximately 110° C. and so held until the viscosity was approximately 1000 centipoises. Water was added to stop the reaction and remove the calcium chloride and to greatly reduce the acidity. The pH value of the washed product was approximately 3.0. The resulting product was soluble in acetone, insoluble in water. The specific gravity was 1.21 at 25° C.

F. 100 parts of furfuryl alcohol and ½ part of diethyl sulfate were heated under the same conditions as Example E, above. That is, when the reaction product reached a viscosity of approximately 1000 to 1500 centipoises the reaction was stopped by the addition of water. The product was insoluble in water, soluble in acetone, practically insoluble in alcohol and petroleum spirits and partially soluble in aromatic solvents. The pH value of the washed product was approximately 3.0.

G. To 400 parts by weight of furfuryl alcohol there was added 5 cc. of a mixture of 10 cc. sulfuric acid and 90 cc. of water: The 5 cc. were added and heat applied to start the reaction. When the reaction became vigorous, an equal volume of water was added and the acid-water mixture was removed by separating the resin which settled at the bottom. The residue was again treated with 5 cc. of the same sulfuric acid mixture and heat was again applied until the polymerization reached a stage where it has a viscosity of a rubbery mass. This mass was washed with water to partly neutralize the acidity. This rubbery mass was soluble in acetone, had specific gravity of 1.25 at 25° C., was insoluble in water, insoluble in alcohol, and insoluble in petroleum spirits. The pH value of the washed product was approximately 3.0.

In the practice of this invention the acidity of the mixture of glyoxal and furfuryl alcohol or the fusible or intermediate polymerized condensation products of furfuryl alcohol is so controlled by the common and well known methods so that the pH of the mixture is between about 0.5 and 6.0. In commercial practice, it is preferable that the pH of the mixture be between about 1 and 2.

Any acidic agent capable of imparting the desired pH to the mixture may be employed. Among some of them are sulfuric, hydrochloric and phosphoric acids. However, it is preferable to employ organic acid agents such as lactic acid, hydroxy acetic acid, diethyl sulfate and the like.

The mixture of glyoxal or polymeric glyoxal either in aqueous solution or in the anhydrous condition is mixed with the furfuryl alcohol or the fusible or intermediate polymerized acid condensation product of furfuryl alcohol. The acidity of this mixture is then fixed so that there will be no exothermic turbulent reaction of the mixture without the application of exteral heat. After the acidity of the mixture is fixed, the mixture is heated to cause the reaction to take place, and by maintaining the pH above 1, heating may be continued and the mixture may be maintained in the state of boiling under a reflux condenser until the intermediate resinous products are produced. These novel intermediate products are soluble in acetone and when cured to their final state, they are substantially infusible and substantially insoluble in acetone, caustic alkalis and mineral acids.

The invention accordingly comprises the several steps and relation of one or more of such steps with respect to each of the others, and compositions of matter possessing the characteristics, properties and relation of components, all of which will be exemplified in the following detailed disclosure and the scope of the invention will be indicated in the claims.

For a fuller understanding of the invention, reference should be had to the following examples which are given to illustrate further the invention and are not to be construed in a limiting sense, all parts being given by weight, unless otherwise indicated.

*Example 1*

| | Grams |
|---|---|
| Furfuryl alcohol | 100 |
| A 30% aqueous solution of polymeric glyoxal, which solution contains free acids in such amount that 2.2 grams of sodium hydroxide would be required to render the solution neutral | 100 |

The above products in said proportions were mixed together. The pH of this mixture is approximately 1.0. This mixture was heated to a temperature of between about 108° C. to 110° C. until an exothermic reaction set in. As the reaction proceeds, the color of the mixture changed from a red to a very dark brown. As the color change took place, the mixture was rapidly cooled to about 60° C. and besides the cooling step, 10 cc. of a 10% sodium hydroxide solution was added thereto. In this manner the reaction was stopped and the reaction mixture was then dehydrated by subjecting the same to a temperature of between 70° C. to 100° C. and under vacuum of about 35 mm. of mercury pressure for about 30 minutes. The vacuum was then discontinued and the mass was further heated in an open beaker to about 125° C. for a few minutes to increase its viscosity. It was then cooled rapidly in order to prevent it from being converted to its infusible state. The product thus obtained and measuring about approximately 122 grams is a thermosetting fusible resin soluble in acetone and insoluble in water. A sample of said intermediate or fusible resin was then placed in an oven at 105° C. for two hours whereupon it was converted to a tough, hard, infusible resin, insoluble in ethanol, acetone, caustic alkali solutions and mineral acids. During this curing step the loss in weight was approximately 10% of the original mass and the specific gravity of the infusible product is greater than 1.2.

Example 2

| | Grams |
|---|---|
| Furfuryl alcohol | 100 |
| An 80% lactic acid aqueous solution | 5 |

The above products in said proportions were heated to boiling and maintained in this state of boiling for a period of about one hour and then allowed to stand whereupon the polymerized acid organic condensation product settled to the bottom and water floated on top. To this mass was added a neutral aqueous solution of polymerized glyoxal (30% conc.). The resulting mass was heated to boiling and maintained in the state of boiling under a reflux condenser for approximately one hour at approximately 108° C. The entire mass was then dehydrated by heating the same at a temperature of about 90° C. in a vacuum of about 30 mm. of mercury pressure whereby there was obtained a liquid thermosetting fusible or heat reactive resin soluble in acetone, insoluble in water and having a specific gravity of 1.2. The yield of said fusible resin thus obtained measured approximately 125 grams. When placed in an oven at 105° C. and maintained at this temperature for a period of about two to three hours, said fusible resin was converted to a tough, dark, infusible resin insoluble in alcohol, acetone, caustic alkali solutions and mineral acids. Said fusible product had a specific gravity greater than 1.2 and weighed about 108 grams.

Example 3

| | Grams |
|---|---|
| Furfuryl alcohol | 100 |
| A neutral aqueous solution of polymerized glyoxal (30% concentration) | 300 |
| Aqeous hydroxy acetic acid | 6 |

The above products in said proportions were mixed together and the mixture was heated to boiling and maintained in this state of boiling under a reflux condenser for about one hour. The temperature was between about 105° C. and 110° C. Then the resultant mass was dehydrated by heating at temperatures between about 75° C. and 100° C. in a vacuum of 35 mm. of mercury pressure whereby there was obtained a liquid thermosetting intermediate fusible resin soluble in alcohol, having a specific gravity over 1.2. A sample of this fusible or heat reactive resin was placed in an oven at 105° C. for two hours and converted to a hard, tough, infusible resin, insoluble in acetone, alcohol, caustic alkali solution and mineral acids.

Example 4

| | Grams |
|---|---|
| Furfuryl alcohol | 100 |
| Glyoxal sodium bisulphite | 200 |
| Lactic acid (80%) | 5 |

The above products in said proportions were heated to boiling and maintained in this state of boiling under a reflux condenser for about four to eight hours. The resulting mass was filtered and the resin which is a liquid, is the filtrate which is a liquid fusible thermosetting resin. This liquid resin is dehydrated and may be cured by heating the same in an oven at 105° C. to convert it from a water insoluble, acetone soluble resin to an infusible resin which is insoluble in acetone, caustic alkalis and mineral acids.

Example 5

An aqueous solution of polymeric glyoxal of about 30% concentration was placed in a large open beaker and dehydrated to 125° C. and then placed in an oven at 105° C. in order to completely dry the product so that on cooling it was sufficiently brittle to be broken up into small pieces. 30 grams of this dry material, 100 grams of fusible polymerized acid condensation product of furfuryl alcohol, made with 100 lbs. of furfuryl alcohol and 16 lbs. of 50% lactic acid, were boiled under a reflux condenser for three hours and then dehydrated at atmospheric pressure and at a temperature of 270° F. to provide a fusible resin, insoluble in water and soluble in acetone. This fusible resin in its end state is tough, hard, substantialy infusible and substantially insoluble in acetone, caustic alkalis and mineral acids.

Example 6

| | Grams |
|---|---|
| Furfuryl alcohol | 100 |
| Glyoxal containing free acids equivalent to the amount stated in Example 1 | 50 |

The above products in said amounts were heated to boiling (about 105° C. to about 110° C.) and maintained in this state of boiling under a reflux condenser for about one hour and then the mass was dehydrated by heating at a temperature between about 60° C. and 85° C. in a vacuum of about 35 mm. of mercury pressure to obtain a liquid intermediate fusible resin soluble in alcohol, acetone and insoluble in water, specific gravity over 1.2. A sample of said thermosetting fusible resin was placed in an oven at 105° C. for sixteen hours and thus converted into a hard, tough infusible resin insoluble in acetone, alcohol, caustic solutions and petroleum solvents.

These intermediate reaction products may be mixed with fillers such as wood flour, asbestos, inorganic products such as barium sulphate and the like and cured to give a hard infusible mass.

The intermediate, heat reactive or infusible resins made in the manner set forth in the foregoing Examples 1 to 6 and either under aqueous or substantially anhydrous conditions are stable, soluble in acetone and ethanol and when heated to their end or final state are tough, hard, substantially infusible and substantially insoluble in caustic alkalis, acetone, ethanol, mineral acids and petroleum spirits. Said intermediate resins may be emulsified with bentonite or they may be dissolved in solvents and then spread as a coating or impregnating material on a base, after which they may be cured on the base to the infusible state by heating. These resins may also be converted to the infusible state, then comminuted and employed as a component of a friction element such as a brake lining or clutch facing. These intermediate resins may be mixed with other resins such as cresol-formaldehyde resins, to improve their caustic resistance. These intermediate resins may be mixed with lignin resins to increase the water and alkali resistance. They may be mixed with cashew nut shell liquid or urea-formaldehyde resins. They may be mixed with one or more fillers such as asbestos, wood flour, barium sulphate and the like and cured to produce a hard infusible mass.

One of the specific uses of these intermediate resins is to dissolve them in a solvent such as alcohol or mixtures of ethyl alcohol and other solvents such as ethyl acetate so that the resin concentration is about 50% to 60%. Then this solution may be employed in laminating sheets of paper, cloth and the like by coating the surfaces thereof with said solution and then bringing the coated surfaces together under pressures of 1000 to 3000 pounds per square inch and at temperatures of 280° F. to 300° F. for about 15 to 60 minutes depending on the thickness of the mass.

These intermediate resins are useful as binders in brake linings, for abrasive particles such as sand, emery, carborundum and the like in the manufacture of grinding wheels. They may also be mixed with polyhydroxy, polybasic acid resins for changing the flexibility or curing characteristics of said acid resins.

The following examples are specific illustrations of the use of these novel intermediate resins with lignin.

*Example 7*

| | Grams |
|---|---|
| Wood flour | 100 |
| The intermediate fusible reaction product of Examples 1 to 6 | 100 |
| Alcohol soluble lignin | 10 |
| Zinc stearate | 2 |
| Boric acid | 5 |
| Carbon black | 5 | were milled together on differential rubber rolls at approximately 180° F. until a sample removed and cooled to room temperature gave a dry brittle mass. The mass which was still fusible was then removed from the rolls, cooled, ground and cured at temperatures between about 280° F. and 400° F. at pressures of approximately 1000 to 2000 pounds per square inch, in from one to fifteen minutes.

*Example 8*

| | Grams |
|---|---|
| The liquid fusible product of Examples 1-6 | 100 |
| Red wood flour containing approximately 30% lignin | 100 |
| Zinc stearate | 2 |
| Boric acid | 5 | were milled together on hot differential rolls at temperatures between approximately 180° F. and 200° F. until a sample removed showed a dry brittle but still fusible mass. It was then removed, ground and cured in the regular manner.

Since certain changes in carrying out the above process and certain modifications in the compositions which embody the invention may be made without departing from its scope, it is intended that all matter contained in the above description shall be interpreted as illustrative and not in a limiting sense.

It is also to be understood that the following claims are intended to cover all the generic and specific features of the invention, which as a matter of language might be said to fall therebetween; and that they are intended to be inclusive in scope and not exclusive, in that, if desired, other materials may be added to our novel composition of matter herein claimed without departing from the spirit of the invention. Particularly it is to be understood that in said claims, ingredients or components recited in the singular are intended to include compatible mixtures of said ingredients wherever the sense permits.

Having thus described our invention, what we claim and desire to protect by Letters Patent is:

1. A resinous organic condensation reaction product of an aldehyde selected from the group consisting of glyoxal and polymerized glyoxal and a material selected from the group consisting of furfuryl alcohol and fusible polymerized acid condensation products of furfuryl alcohol, said resinous product in its end state being substantially infusible and substantially insoluble in acetone, caustic alkalis and mineral acids.

2. A resinous organic condensation reaction product of polymerized glyoxal and a material selected from the group consisting of furfuryl alcohol and fusible polymerized acid condensation products of furfuryl alcohol.

3. A resinous organic condensation reaction product of an aqueous solution of polymerized glyoxal and a material selected from the group consisting of furfuryl alcohol and fusible polymerized acid condensation products of furfuryl alcohol.

4. A resinous organic condensation reaction product of glyoxal and furfuryl alcohol.

5. A resinous organic condensation reaction product of polymerized glyoxal and furfuryl alcohol.

6. A resinous organic condensation reaction product of an aqueous solution of polymerized glyoxal and furfuryl alcohol.

7. A resinous organic condensation reaction product of glyoxal and a fusible polymerized acid organic condensation product of furfuryl alcohol.

8. A resinous organic condensation reaction product of polymerized glyoxal and a fusible polymerized acid organic condensation product of furfuryl alcohol.

9. A resinous organic condensation reaction product of an aqueous solution of polymerized glyoxal and a fusible polymerized acid organic condensation product of furfuryl alcohol.

10. A resinous organic condensation reaction product of lignin, an aldehyde selected from the group consisting of glyoxal and polymerized glyoxal and a material selected from the group consisting of furfuryl alcohol and fusible polymerized acid condensation products of furfuryl alcohol, said resinous product in its end state being substantially infusible and substantially insoluble in acetone, caustic alkalis and mineral acids.

11. A resinous organic condensation reaction product of lignin, polymerized glyoxal and a material selected from the group consisting of furfuryl alcohol and fusible polymerized acid condensation products of furfuryl alcohol.

12. A resinous organic condensation reaction product of lignin, an aqueous solution of polymerized glyoxal and a material selected from the group consisting of furfuryl alcohol and fusible polymerized acid condensation products of furfuryl alcohol.

13. A resinous organic condensation reaction product of lignin, glyoxal and furfuryl alcohol.

14. A resinous organic condensation reaction product of lignin, polymerized glyoxal and furfuryl alcohol.

15. The method comprising heating under acidic conditions a mixture of an aldehyde selected from the group consisting of glyoxal and polymerized glyoxal, and a material selected from the group consisting of furfuryl alcohol and fusible polymerized acid organic condensation products of furfuryl alcohol.

16. The method comprising heating under such acidic conditions that the pH is between about 0.5 and 6.0, a mixture of an aldehyde selected from the group consisting of polymerized glyoxal and glyoxal and a material selected from the group consisting of furfuryl alcohol and fusible polymerized acid organic condensation products of furfuryl alcohol.

17. The method comprising heating under such acidic conditions that the pH is between about 0.5 and 6.0, a mixture of polymerized glyoxal and a material selected from the group consisting of furfuryl alcohol and fusible polymerized acid organic condensation products of furfuryl alcohol.

18. The method comprising heating under such acidic conditions that the pH is between approximately 1 and 2, a mixture of an aldehyde selected from the group consisting of glyoxal and polymerized glyoxal and a material selected from the group consisting of furfuryl alcohol and fusible polymerized acid organic condensation products of furfuryl alcohol.

19. The method comprising heating under such acidic conditions that the pH is between approximately 1 and 2 a mixture of polymerized glyoxal and a material selected from the group consisting of furfuryl alcohol and fusible polymerized acid organic condensation products of furfuryl alcohol.

MORTIMER T. HARVEY.
ROBERT F. DURST.